(12) United States Patent
Kah

(10) Patent No.: US 7,421,938 B2
(45) Date of Patent: Sep. 9, 2008

(54) POSITIONER FOR A FLUID ACTUATOR

(75) Inventor: Harald Kah, Brechen (DE)

(73) Assignee: Samson Aktiengesellschaft, Frankfurt (DE)

(*) Notice: Subject to any disclaimer, the term of this patent is extended or adjusted under 35 U.S.C. 154(b) by 420 days.

(21) Appl. No.: 11/337,929

(22) Filed: Jan. 23, 2006

(65) Prior Publication Data

US 2006/0222509 A1 Oct. 5, 2006

(30) Foreign Application Priority Data

Jan. 31, 2005 (DE) .................. 10 2005 004 418

(51) Int. Cl.
*F15B 9/09* (2006.01)
(52) U.S. Cl. .................. 91/363 R; 91/361
(58) Field of Classification Search .................. 91/361, 91/363 R, 363 A
See application file for complete search history.

(56) References Cited

U.S. PATENT DOCUMENTS 3,225,785 A * 12/1965 Goike .................. 91/363 R
5,934,169 A * 8/1999 Regel .................. 91/363 R
6,512,960 B1 * 1/2003 Schulz .................. 91/361

FOREIGN PATENT DOCUMENTS

DE 41 23 147 C2 4/1995
DE 44 29 401 A1 2/1996

* cited by examiner

*Primary Examiner*—Michael Leslie
(74) *Attorney, Agent, or Firm*—Christensen O'Connor Johnson Kindness PLLC

(57) ABSTRACT

A positioner for a fluid actuator comprising an electronics assembly designed for setpoint/actual value comparison and for outputting a feedback control signal includes a current/pressure transducer receiving the feedback control signal for controlling the actuator, an analog power supply, particularly in a range 4 to 20 mA, for powering the electronics assembly, and an additional voltage input, particularly in a range of up to 24 V, wherein said voltage input is configured as a further power supply for powering the current/pressure transducer separate from the analog power supply.

19 Claims, 1 Drawing Sheet

POSITIONER FOR A FLUID ACTUATOR

BACKGROUND

The present invention relates to a positioner for a fluid, particularly pneumatic, actuator driven by pressurising fluid, as often finds application for actuating translational or rotational final control elements, such as valves, in process and system engineering. A positioner for a fluid actuator has an electronics assembly which via a positional setpoint/positional actual value comparison outputs a signal for feedback control of a current/pressure transducer for controlling the fluid actuator. The current/pressure transducer may comprise a pneumatic pilot stage via which the pneumatic main stage connected to a particularly constant compressed air source may be activated, the main stage driving a final control element of the actuator by pressurising fluid activation. As an alternative the current/pressure transducer may be configured as a structural unit.

Published German Application DE 44 29 401 C2 discloses such a positioner for which an inherently safe quick-action ventilating system according to type "e" protection is proposed which is engineered to run the final control element to a fail-safe position when called for. In this known positioner, a feedback control electronics assembly and the current/pressure transducer are powered by an analog power supply defined by 4 to 20 mA and 9.6 V. The electronics assembly is powered directly by the analog power supply. The current/pressure transducer is powered via an electrical conductor from the electronics assembly with both a feedback control signal and with the power of the analog power supply as is non-consumed by the electronics assembly. When the system is down or at fault, the control element of the actuator is run to a fail-safe position by the actuator being dumped. This is achieved by an emergency switch having a spring for automatically open-circuiting the emergency switch in the electrical conductor between the electronics assembly and current/pressure transducer. The emergency switch also has a coil connected to a usually binary emergency voltage input of 12 V via which the coil provides electromagnetic forces in closing the emergency switch by overcoming the spring force. When the voltage is missing—in other words, when the system is down—the emergency switch is open-circuited to break the electrical connection between the electronics assembly and the current/pressure transducer, resulting in the current/pressure transducer for dumping the actuator being out of circuit.

The structure of this known positioner is risky in terms of safety in that there is no total separation of the electric circuits of the positioner from its analog power supply and of the dump system from its binary emergency voltage. It has been discovered, namely, that a "residual current"—despite the system being down, in other words with lack of the 24 V emergency voltage—flows in the electrical conductor between the electronics assembly and the current/pressure transducer, inducing stray currents in the coil of the switch. The closing forces induced by these stray currents in the emergency switch may even be sufficient to maintain the emergency switch closed for a time which is at least still risky for safe OFF and during which the actuator cannot be dumped to the fail-safe position instantly when the system is at fault. Furthermore, because of its mechanical spring component, the emergency switch structure may malfunction because of material fatigue, risking the current/pressure transducer not being signalled OFF with the mandatory high assurance. In conclusion, the power supply balance of this known positioner has disadvantages in that, because of having to operate the current/pressure transducer by the analog power supply, only a restricted amount of energy of the analog power supply is available for consumption by the electronics components of the positioner.

SUMMARY

The following summary is provided to introduce various concepts in a simplified form that are further described below in the Detailed Description. This summary is not intended to identify specific key features of the claimed subject matter, nor is it intended to be used to determine the scope of the claimed subject matter.

Embodiments of the invention overcome the foregoing disadvantages of the prior art, particularly by providing a positioner with optimized fail-safe, enhanced reliability and with fewer mechanical components with which particularly higher power electronic components for a higher performance positioner can now be employed.

A positioner according to one embodiment of the invention comprises, for a fluid actuator driven by pressurising fluid, an electronics assembly designed for a positional setpoint/positional actual value comparison and for outputting a feedback control signal received by a current/pressure transducer for controlling the actuator, an analog power supply particularly in a range from 4 to 20 mA for powering the electronics assembly, and an additional voltage input particularly in a range up to 24V. Just as possible, however, are corresponding usual standard signals with voltages of 5 V, 12 V or the like at the voltage input.

Now, in accordance with one aspect of the invention, the voltage input is configured as a further power supply separate from the analog power supply, more particularly as an extension thereof, to which the current/pressure transducer is connected for its power supply. In other words, the current/pressure transducer is now powered independently of the analog power supply, by an additional power supply formed by the voltage input. The electronics assembly of the feedback control can now be powered preferably exclusively by the analog power supply.

A configuration as described above with two separate power supplies optimizes fail-safe functioning of the positioner because any mutual electrical interference of the electronics assembly by the positioning and dumping is now excluded without having to add to the number of mechanical components. Indeed, it has surprisingly been discovered that making the change in accordance with the invention even reduces the number of mechanical components, because there is now no need for a spring-biased switch or relay assembly. Apart from this, the foregoing aspect of the invention now makes it possible to select electronic components that consume a higher amount of power because the analog power supply, as standard for many actuators, is now exclusively available for the feedback control electronics of the positioner, thus granting the designer of the positioner added flexibility in defining the architecture of the electronic components of an even higher performance positioner.

It has been surprisingly discovered in application of the invention that a standard binary emergency control voltage of 24 V is sufficient to at least power the current/pressure transducer adequately. Between the electronics assembly and the current/pressure transducer an electrical conductor is installed, the power level of which is simply sufficient for communicating the control signal.

In one aspect of the invention, the further power supply is provided with an amplifier, particularly an operational amplifier, downstream of the voltage input. This amplifier serves to amplify the low power control signal to be applied to the current/pressure transducer, the power supply at the voltage input resulting in the feedback control signal being amplified. The amplified feedback control signal is applied to the current/pressure transducer for controlling the particularly pneumatic main control stage.

In one preferred embodiment of the invention, the further power supply comprises, downstream of the voltage input, electronic structure for stabilizing and, where necessary, rectifying the output voltage of the voltage input, for example to 5 V. This stabilizer may comprise transistors, zener diodes, integrated circuits or the like. In particular, the stabilizer is provided upstream of the amplifier so that the voltage at the amplifier is substantially always the same.

In another aspect of the invention, the power of the feedback control signal supplied to the current/pressure transducer is set, particularly reduced or modulated, so that on failure or a "zero" logic status of the, in particular, binary power supply, the current/pressure transducer is deactivated, and in operation or a "one" logic status of the, in particular, binary power supply, the current/pressure transducer can be operated by control particularly in accordance with the amplified feedback control signal. This ensures on loss of the 24 V emergency voltage that, despite a continuation of the analog power supply from 10 mA to 20 mA or occurrence of a "residual current," the current/pressure transducer remains deactivated so that the requirement for dumping the actuator and assuming the fail-safe position is automatically satisfied.

Preferably, feedback control between the electronics assembly and the current/pressure transducer is provided with a current limiter. This current limiter may be configured as an electric resistor, a metal film resistor or as an optocoupler, for example.

In another preferred embodiment of the invention, the electronics assembly and the current/pressure transducer are accommodated in a separate, preferably sealed enclosure. The pneumatic main control stage, such as the pneumatic amplifier, may be arranged outside of the enclosure.

Furthermore, the positioner in accordance with the invention may be configured with a diagnostic apparatus. This diagnostic apparatus may include a sensor for sensing the switching condition of the current/pressure transducer, the switching condition signal of the diagnostic apparatus being suitable for communication in particular via a current limiter to the electronics assembly.

In yet another aspect of the invention, an additional circuitry for monitoring the switching condition of the voltage input is provided, this monitoring signal being suitable for communication in particular via a current limiter to the electronics assembly.

DESCRIPTION OF THE DRAWINGS

Further advantages, features and properties of the invention will now be detailed by describing preferred aspects with reference to the drawings in which.

DETAILED DESCRIPTION

Figure 1:
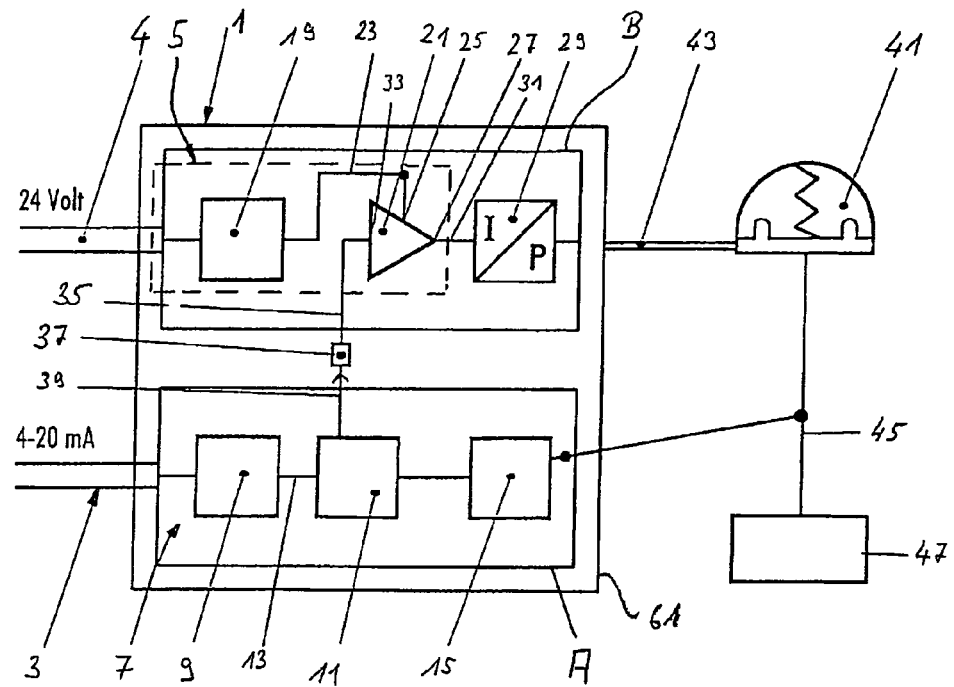
FIG. 1 is block diagram of a first version of a positioner in accordance with the invention.

Referring now to FIG. 1, there is illustrated a positioner 1 constructed in accordance with the invention comprising two power supplies, each separate from the other, i.e. one for the positioner A, one for the emergency air dump or quick-action ventilating system B. The power supplies are defined by a first analog power supply 3 with a current level of 4 to 20 mA for the positioner, and a second further power supply 5 with a standard binary voltage input 4 for an emergency signal of 24 V for the emergency air dump B.

Connected to the analog power supply 3 is an electronics assembly 7 constituting the positioner. The electronics assembly 7 comprises an input circuit 9 with a power supply or supply circuit (not shown) as may be configured as a transistor, zener diode or the like. Downstream of the input circuit 9 is a microprocessor 11 operated by the supply output signal 13 of the input circuit 9. The microprocessor 11 compares a stored setpoint value to an actual positional value sensed by displacement sensor 15, in conjunction with the microprocessor 11, as regards the position or angular setting of drive shaft 45, which is connected to a final control element 47, the displacement sensor 15 being likewise powered by the power of the power supply 3.

The further power supply 5 for an I/P-transducer 29 is formed by the voltage input 4, power supply or supply circuit 19, and operational amplifier 21. Applied to the voltage input 4 is the power supply 19 for stabilizing the power supply for an operational amplifier 21 downstream of the power supply 19. The power supply 19 is superfluous when the operational amplifier is designed immune to voltage fluctuations. The stabilized supply signal 23 is applied to the input 25 of the operational amplifier 21. The output 27 of the operational amplifier 21 is electrically connected to the I/P-transducer 29, which is activated and operated by a combined power/feedback control signal 31.

The microprocessor 11 is connected to a control signal input 33 of the operational amplifier 21 via a feedback control line 35 provided with a current limiter 37 which ensures that the power of the feedback control signal 39 is reduced such that, without amplification, it is not strong enough to operate the I/P-transducer 29.

The I/P-transducer 29 is connected to a pneumatic main stage (not shown) which, as controlled by the I/P-transducer 29, drives a pneumatic actuator 41. The pneumatic connection to the pneumatic main control stage, as well as the coupling from the current/pressure transducer to the pneumatic main control stage, is indicated by the reference numeral 43.

The electronic components of the positioner A and emergency air dump B, particularly the I/P-transducer 29, are accommodated in a common fluid-tight enclosure or housing 61. The displacement sensor 15 senses the positioning of the drive shaft 45 by non-contact means for which a Hall sensor (not shown) may be employed, for example. As an alternative, a potentiometer may be provided which is mechanically linked to the drive shaft 45.

Operation of the positioner 1 will now be detailed:

In normal operation of the positioner 1, the power supply 3 powers all components of the electronics assembly 7 for performing the comparison of the stored positional setpoint value to the actual value as sensed by the displacement sensor 15. The power of the feedback control signal 39 is reduced by the current limiter 37. The reduced feedback control signal 35 is applied via the control signal input 33 to the operational amplifier 21 which increases the power of the feedback control signal 35 by means of the voltage input 4. The combined power/feedback control signal 31 applied to the I/P-transducer 29 prompts operation of the I/P-transducer 29 in accordance with the control.

In an emergency situation, as typically defined by lack of the 24 V input voltage, the I/P-transducer 29 is instantly signalled OFF, or at least its power reduced such that any signals—for example stray currents of the electronics assembly 7 gaining access to the I/P-transducer 29 or the continued power supply at the power supply 3—are too weak to operate the I/P-transducer 29.

With the positioner 1 in accordance with the invention, a fail-safe level is now attained to ensure the final control element being rendered fail-safe with a probability bordering on certainty.

Figure 2:
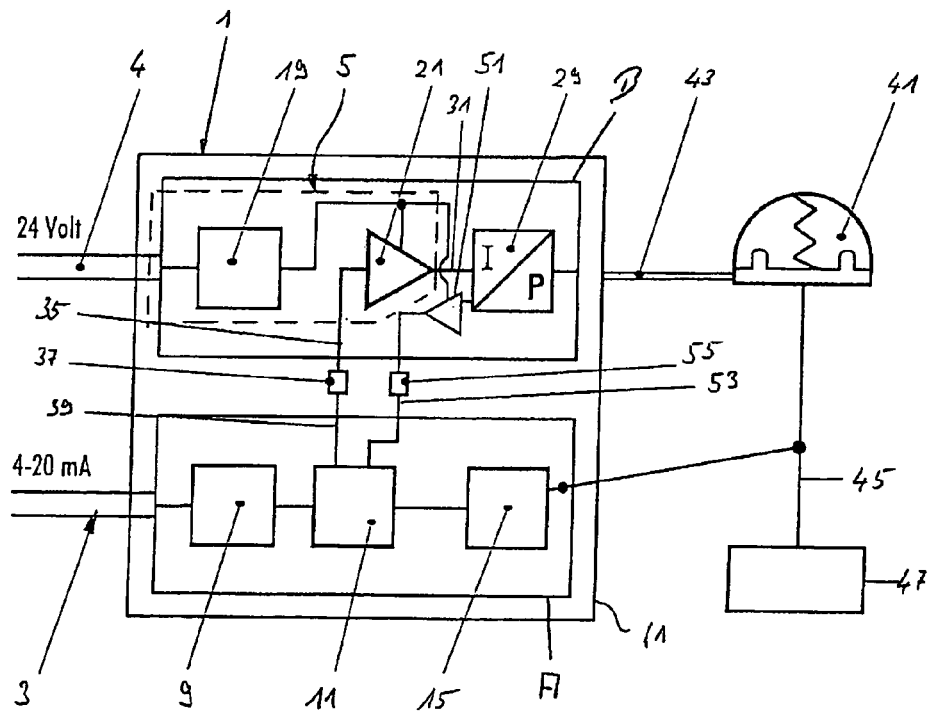
FIG. 2 is block diagram of a second version of a positioner in accordance with the invention.

Referring now to FIG. 2, there is illustrated a further version of a positioner 1 constructed in accordance with the invention. For a better understanding of the description of FIG. 2, components of the positioner as shown in FIG. 2 identified or similar to those of the positioner as shown in FIG. 1 are identified by like reference numerals.

The positioner 1 as shown in FIG. 2 differs substantially from the positioner as shown in FIG. 1 by an additional diagnostic apparatus 51 being provided, comprising a sensor for sensing the switching condition of a magnetic valve (not shown) of the I/P-transducer 29. The diagnostic apparatus 51 is likewise powered by the binary power supply 5 so that the analog power supply 3 is not additionally loaded. The diagnostic apparatus 51 is connected by a communicating line 53 to the microprocessor 11, the communicating line 53 comprising a current limiter 55.

The embodiments of the positioner 1 as shown in FIGS. 1 and 2 may also include circuitry for monitoring the voltage input 4, i.e. monitoring the actual voltage level at the voltage input 4. Feedback of the monitoring signal as a low strength signal by a current-limiting input to the microprocessor 11 optimizes reliably safe operation of the positioner 1 in accordance with the invention.

LIST OF REFERENCE NUMERALS 1 positioner
3 power supply
4 voltage input
5 power supply
7 electronics assembly
9 input circuit
11 microprocessor
13 power supply output signal
15 displacement sensor
19 power supply
20 operational amplifier
23 supply signal
25 operational amplifier power input
27 operational amplifier output
29 I/P transducer
31 power and feedback control signal
33 control signal input
35 feedback control signal line
37 current limiter
39 feedback control signal
41 actuator
43 pneumatic connection
45 drive shaft
47 final control element
51 diagnostic apparatus
53 communication line
55 current limiter
61 enclosure
A positioning
B emergency air dump While various embodiments have been illustrated and described, it will be appreciated that changes can be made therein without departing from the spirit and scope of the invention. The features of the invention as disclosed in the above description as well as in the claims may be substantial to achieving the invention in its various embodiments both individually and in any combination thereof.

The embodiments of the invention in which an exclusive property or privilege is claimed are defined as follows:

1. A positioner for a fluid actuator driven by pressurising fluid, comprising:
   an electronics assembly for comparing positional setpoint and positional actual values and for outputting a feedback control signal;
   a current/pressure transducer receiving the feedback control signal for controlling the fluid actuator
   an analog electrical power supply for powering the electronics assembly; and
   an additional voltage input configured as a further input power supply for powering said current/pressure transducer separate from said analog electrical power supply.

2. The positioner according to claim 1, characterized in that said analog electrical power supply supplies current in a range of 4 to 20 mA.

3. The positioner according to claim 1, characterized in that said additional voltage input supplies voltage in a range of up to 24 V.

4. The positioner according to claim 1, characterized in that said further input power supply comprises a binary voltage input providing an emergency control signal and to which said current/pressure transducer is connected.

5. The positioner according to claim 1, characterized in that said further input power supply is provided with an operational amplifier downstream of said voltage input.

6. The positioner according to claim 1, characterized in that said further input power supply comprises, downstream of said voltage input, electronic structure for rectifying or stabilizing the voltage and/or current of said voltage input.

7. The positioner according to claim 6, characterized in that said electronic structure is a power supply formed by one or more of transistors, zener diodes, and integrated circuits.

8. The positioner according to claim 6, characterized in that said electronic structure is included upstream of an amplifier.

9. The positioner according to claim 1, characterized in that the power of said control signal supplied to said current/pressure transducer is set so that on failure of said voltage input, said current/pressure transducer is deactivated, and in operation of said voltage input, said current/pressure transducer is operated as controlled.

10. The positioner according to claim 9, characterized in that the power of said control signal supplied to said current/pressure transducer is reduced so that on failure of said voltage input, said current/pressure transducer is deactivated.

11. The positioner according to claim 1, characterized in that a communication of said control signal between said electronics assembly and said current/pressure transducer is provided with a current limiter.

12. The positioner according to claim 11, characterized in that said current limiter is configured as an electric resistor, a metal film resistor or as an optocoupler.

13. The positioner according to claim 1, characterized in that said electronics assembly and said current/pressure transducer are accommodated in a separate enclosure.

14. The positioner according to claim 13, characterized in that said enclosure is sealed.

15. The positioner according to claim 13, characterized in that pneumatic components of said actuator are arranged outside of said enclosure.

16. The positioner according to claim 1, characterized in that a diagnostic apparatus is provided for sensing the switching condition of said current/pressure transducer and outputting a switching condition signal, said switching condition signal of said diagnostic apparatus being suitable for communication to said electronics assembly.

17. The positioner according to claim 16, characterized in that said switching condition signal is communicated to said electronics assembly via a current limiter.

18. The positioner as set forth in claim 1, characterized in that an additional circuitry for monitoring said switching condition of said voltage input is provided, the additional circuitry outputting a monitoring signal that is communicated to said electronics assembly.

19. The positioner as set forth in claim 18, characterized in that the monitoring signal is communicated to said electronics assembly via a current limiter.

* * * * *